US011602970B2

United States Patent
Goto et al.

(10) Patent No.: US 11,602,970 B2
(45) Date of Patent: Mar. 14, 2023

(54) ELECTRIC SUSPENSION DEVICE

(71) Applicant: HONDA MOTOR CO., LTD., Tokyo (JP)

(72) Inventors: Yuya Goto, Wako (JP); Ryoma Kanda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 71 days.

(21) Appl. No.: 17/205,380

(22) Filed: Mar. 18, 2021

(65) Prior Publication Data
US 2021/0291610 A1 Sep. 23, 2021

(30) Foreign Application Priority Data
Mar. 19, 2020 (JP) .............................. JP2020-048908

(51) Int. Cl.
*B60G 17/0165* (2006.01)
*B60G 17/015* (2006.01)
*B60G 17/016* (2006.01)

(52) U.S. Cl.
CPC ..... *B60G 17/0165* (2013.01); *B60G 17/0157* (2013.01); *B60G 17/0164* (2013.01);
(Continued)

(58) Field of Classification Search
CPC ............ B60G 17/0165; B60G 17/0157; B60G 17/0164; B60G 2400/206; B60G 2400/60; B60G 2400/821; B60G 2500/10
See application file for complete search history.

(56) References Cited

U.S. PATENT DOCUMENTS
2013/0197754 A1 8/2013 Lee et al.
2017/0274724 A1 9/2017 Liu et al.
(Continued)

FOREIGN PATENT DOCUMENTS
CN 109130754 A 1/2019
CN 109130755 A 1/2019
(Continued)

OTHER PUBLICATIONS

Office Action received in corresponding CN application No. 202110267849.5 dated Mar. 28, 2022 with English translation (11 pages).
(Continued)

*Primary Examiner* — James M McPherson
*Assistant Examiner* — Kyle J Kingsland
(74) *Attorney, Agent, or Firm* — Rankin, Hill & Clark LLP

(57) ABSTRACT

Provided is an electric suspension device including an electromagnetic actuator that is provided between a body and wheel of a vehicle and generates a load for damping vibration of the body. It includes: a camera that detects preview image information of a road surface in front of the vehicle; a 3D gyro sensor that detects a sprung speed of the vehicle; a target load computation unit that computes a target load based on the preview image information and the sprung speed; and a load control unit that controls the load of the actuator by using the computed target load. When a detection result based on the preview image information indicates that the front road surface is even but a detection result based on the sprung speed indicates that the front road surface is uneven, the target load computation unit computes the target load based on the sprung speed.

3 Claims, 9 Drawing Sheets

(52) U.S. Cl.
CPC .. *B60G 2202/422* (2013.01); *B60G 2400/206* (2013.01); *B60G 2400/60* (2013.01); *B60G 2400/821* (2013.01); *B60G 2500/10* (2013.01)

(56) References Cited

U.S. PATENT DOCUMENTS

| | | |
|---|---|---|
| 2018/0361813 A1 | 12/2018 | Ohno et al. |
| 2018/0361814 A1 | 12/2018 | Ohno et al. |
| 2018/0361816 A1 | 12/2018 | Ohno et al. |
| 2019/0232748 A1* | 8/2019 | Mohamed .......... B60G 17/0165 |
| 2020/0023705 A1 | 1/2020 | Hirao et al. |
| 2021/0354523 A1* | 11/2021 | Hirao ...................... F16F 15/02 |

FOREIGN PATENT DOCUMENTS

| | | | |
|---|---|---|---|
| CN | 110267832 | A | 9/2019 |
| JP | H06-106939 | A | 4/1994 |
| JP | 2008-094210 | A | 4/2008 |
| JP | 2013-154843 | A | 8/2013 |
| JP | 2017-171156 | A | 9/2017 |
| JP | 2019001368 | A | 1/2019 |

OTHER PUBLICATIONS

Office Action received in corresponding Japanese application No. 2020-048908 dated Aug. 31, 2021 with English translation (6 pages).

\* cited by examiner

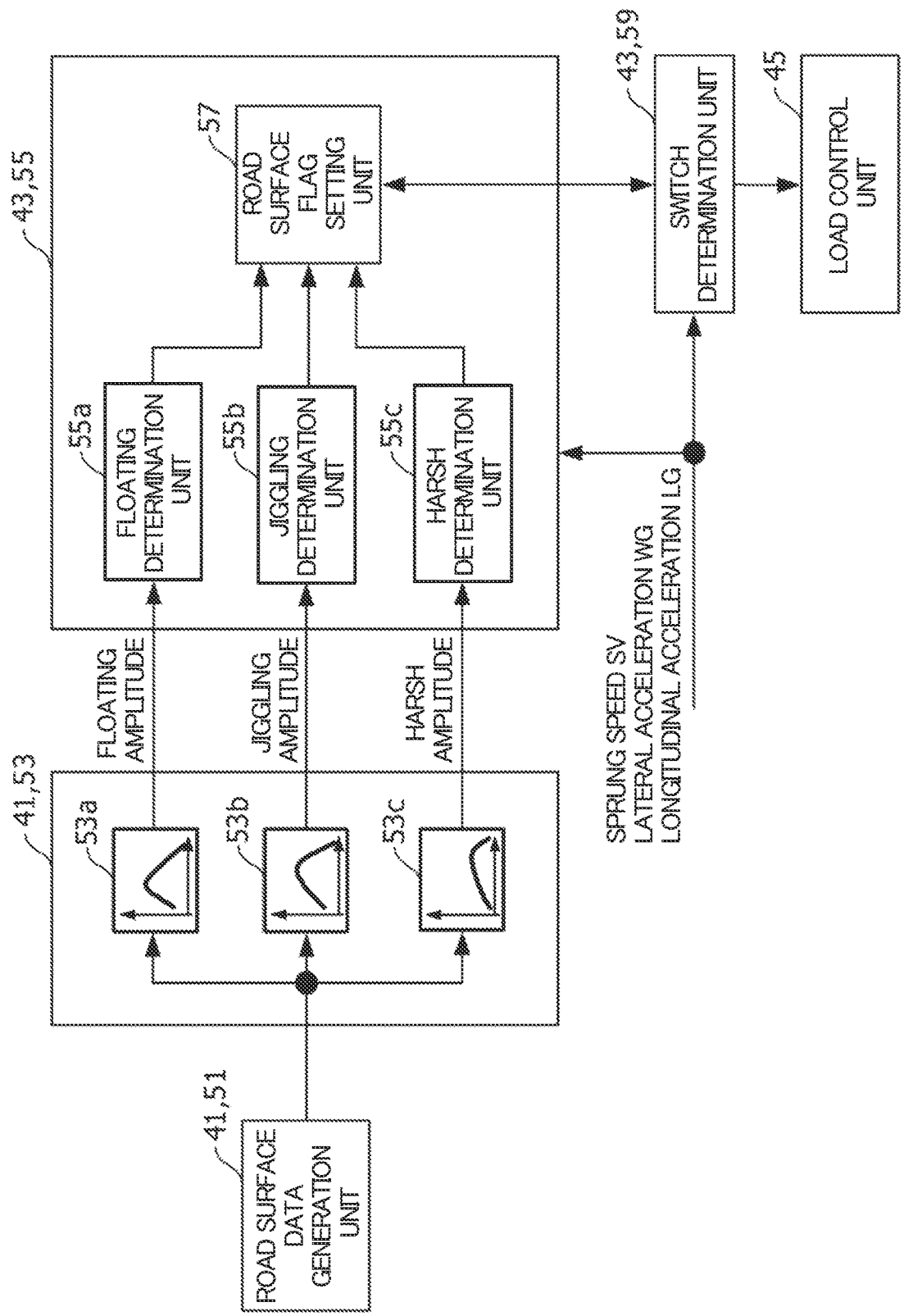

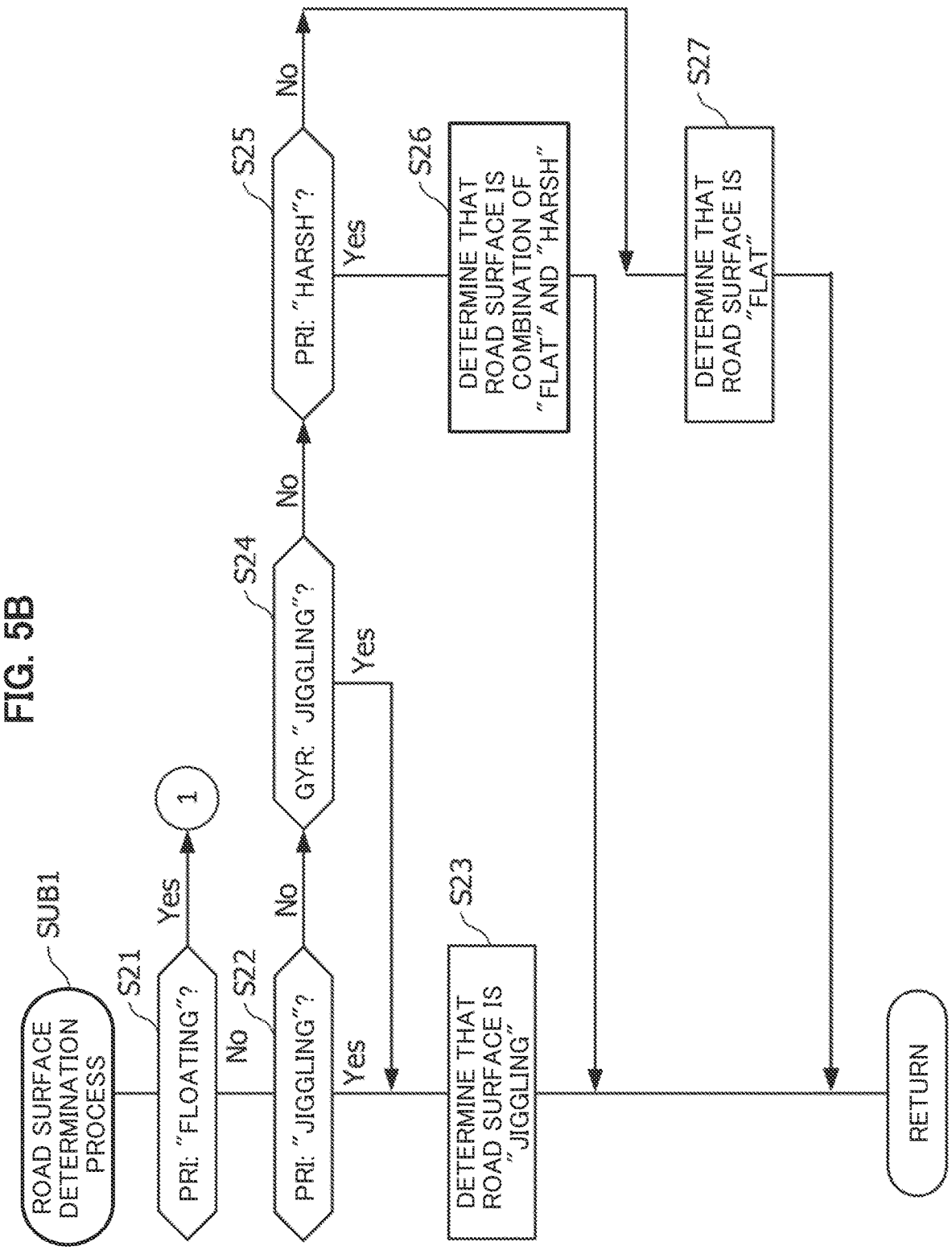

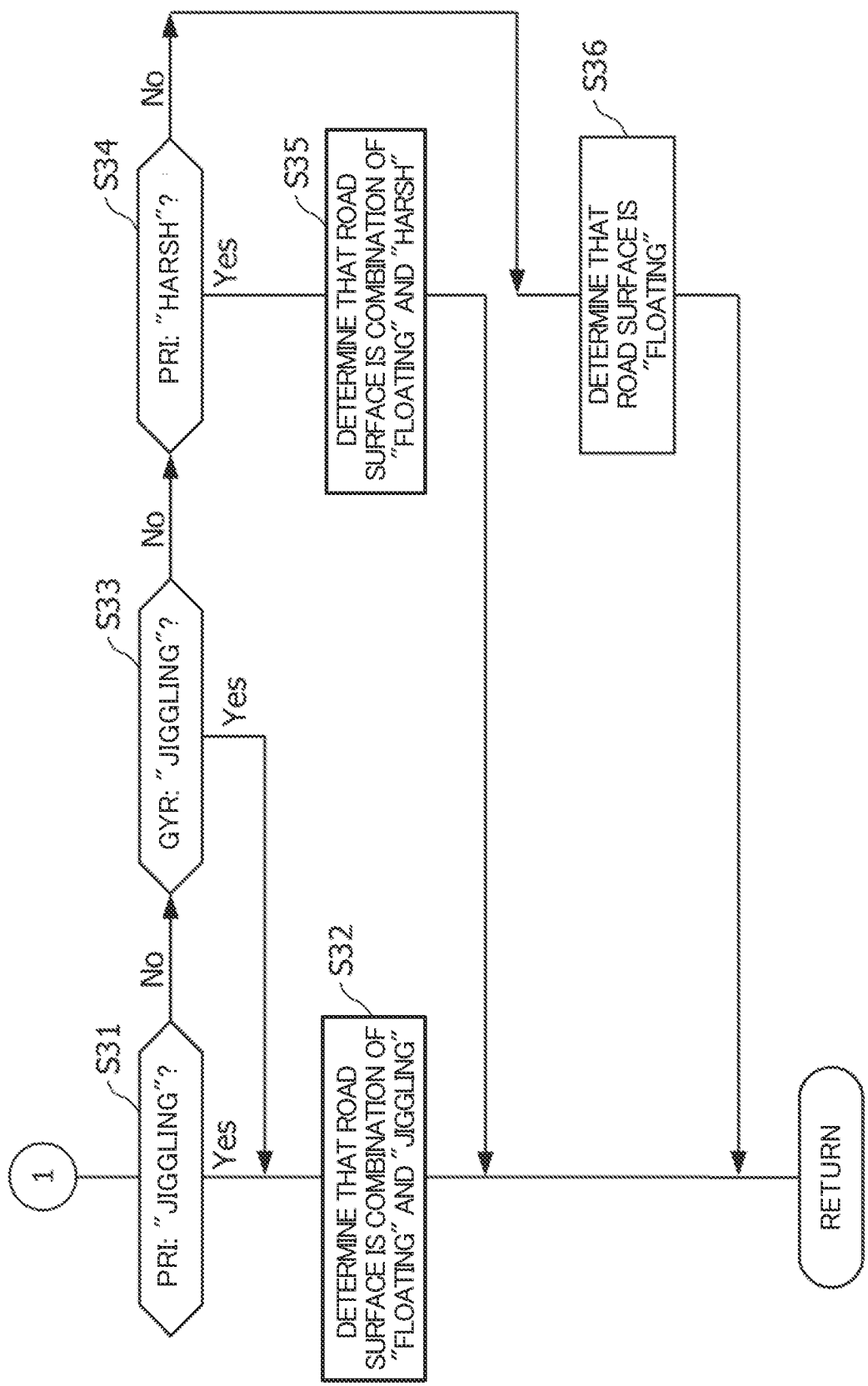

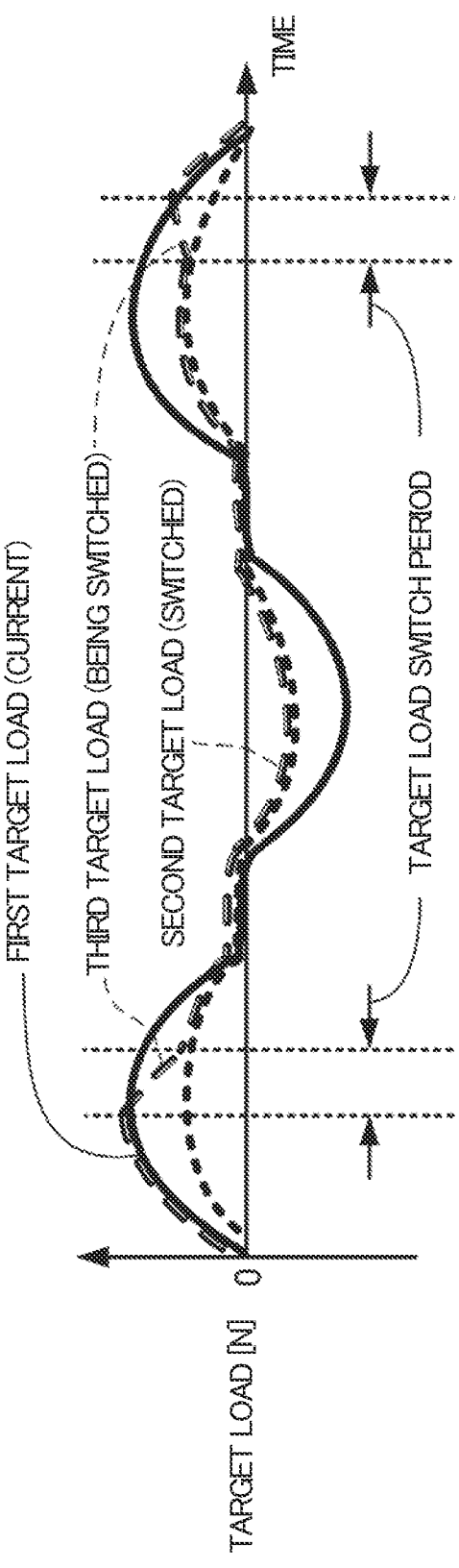
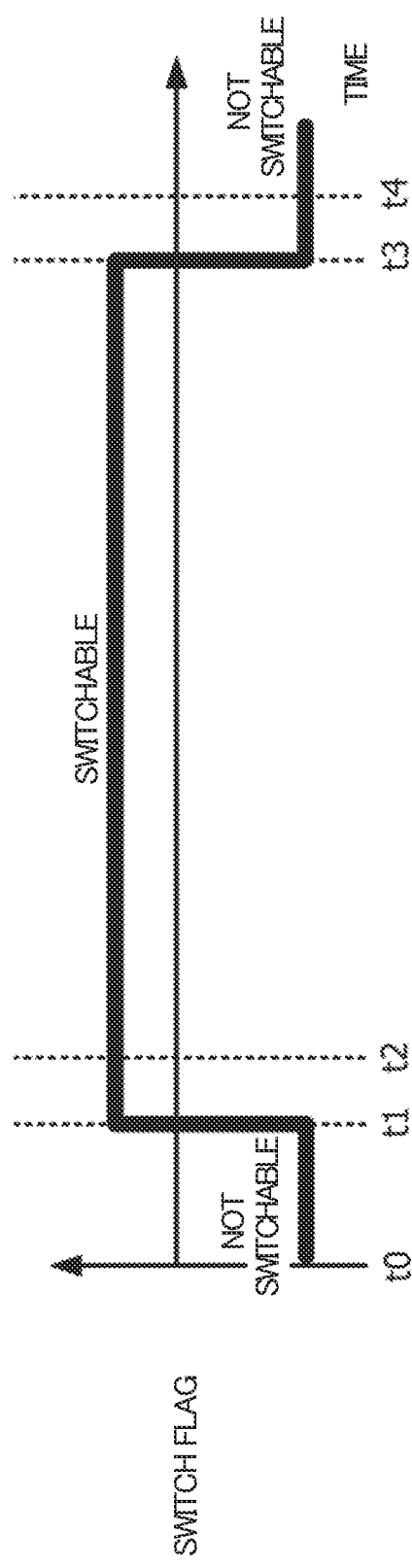
FIG. 6A
FIG. 6B

ELECTRIC SUSPENSION DEVICE

CROSS-REFERENCE TO RELATED APPLICATION

This application is based upon and claims priority from the Japanese Patent Application No. 2020-048908, filed on Mar. 19, 2020, the entire contents of which are incorporated herein by reference.

BACKGROUND OF THE INVENTION

1. Field of the Invention

The present invention relates an electric suspension device including an actuator that is provided between a body and a wheel of a vehicle and generates a load for damping vibration of the body.

2. Description of the Related Art

An electric suspension device has heretofore been known which includes an actuator that is provided between a body and a wheel of a vehicle and generates a load for damping vibration of the body (see Japanese Patent Application Publication No. 2017-171156).

The electric suspension device disclosed in Japanese Patent Application Publication No. 2017-171156 has a control device that stores a reference time set at a value within a predetermined range including the time period of the resonance period of the front wheels. The control device operates such that, when determining that a predetermined vertical displacement portion is present in front of a front wheel based on a detection result from a preview sensor, the control device sets the damping coefficient of a corresponding shock absorber at the minimum value before the timing at which the front wheel reaches the predetermined vertical displacement portion, and returns the control of the damping coefficient to control following a predetermined control law after the elapse of a predetermined time based on the reference time from the above timing.

The electric suspension device disclosed in Japanese Patent Application Publication No. 2017-171156 can reduce an impact applied to the vehicle body when a front wheel runs over a predetermined vertical displacement portion while also effectively damping vibration of the vehicle body, without detecting a vibration state of the vehicle body such as the relative speed between the vehicle body and the wheel.

SUMMARY OF THE INVENTION

Here, the electric suspension device disclosed in Japanese Patent Application Publication No. 2017-171156 performs control that damps vibration of the vehicle body based on the result of the detection of the road surface condition by the preview sensor, such as a camera, without detecting the vibration state of the vehicle body, such as the relative speed between the vehicle body and each wheel. For this reason, if the result of the detection of the road surface condition contains an error, there is a possibility of not only failing to damp vibration of the vehicle body but, conversely, increasing the vibration of the vehicle body. Consequently, the ride quality of the vehicle may be deteriorated, as opposed to the expectation.

The present invention has been made in view of the above circumstance and an object thereof is to provide an electric suspension device capable of maintaining the ride quality of a vehicle comfortable even when the result of detection of a road surface condition contains an error.

In order to achieve the above object, an electric suspension device including an actuator that is provided between a body and a wheel of a vehicle and generates a load for damping vibration of the body is provided as an electric suspension device according to the present invention (1). The main feature of the electric suspension device is that it includes: a road surface condition detection unit that detects a front road surface condition of a front road surface in front of the vehicle; a sprung state amount detection unit that detects sprung state amounts of a sprung mass of the vehicle; a target load computation unit that computes a target load based on the front road surface condition and the sprung state amounts; and a load control unit that controls the load of the actuator by using the target load computed by the target load computation unit, and that in a case where information indicating that the front road surface is even is acquired as a detection result based on the front road surface condition detected by the road surface condition detection unit but information indicating that the front road surface is uneven is acquired as a detection result based on the sprung state amounts detected by the sprung state amount detection unit, the target load computation unit computes the target load based on the sprung state amounts.

According to the electric suspension device according to the present invention (1), it is possible to maintain the ride quality of a vehicle comfortable even when the result of detection of a road surface condition contains an error.

BRIEF DESCRIPTION OF THE DRAWINGS

FIG. 4 is a diagram conceptually illustrating an internal configuration of the load control ECU included in the electric suspension device according to an embodiment of the present invention.

FIG. 5B is a flowchart to be used to describe operations in the road surface determination process illustrated in FIG. 5A.

FIG. 5C is a flowchart to be used to describe operations in the road surface determination process illustrated in FIG. 5A.

FIGS. 6A and 6B are time charts to be used to describe operation of the electric suspension device according to an embodiment of the present invention.

DETAILED DESCRIPTION OF THE EMBODIMENTS

Figure 1:
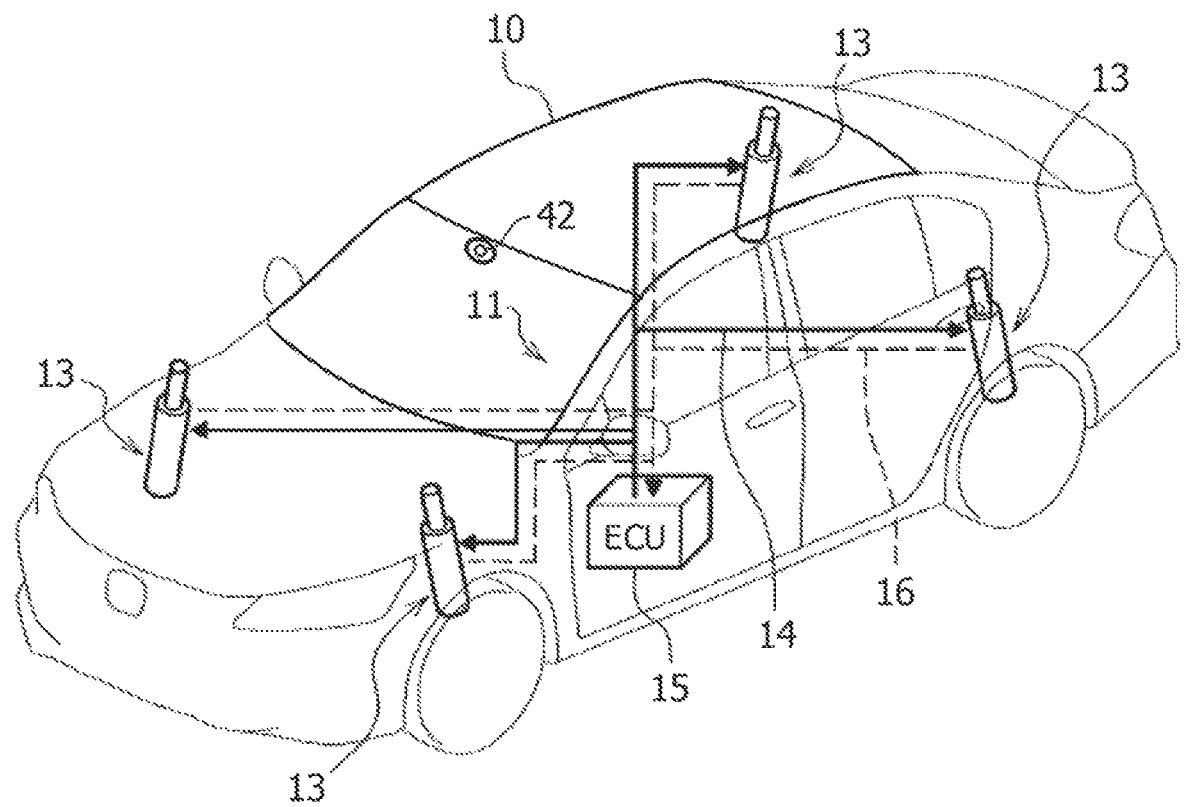
FIG. 1 is a diagram of an entire configuration of electric suspension devices according to embodiments of the present invention.

Electric suspension devices 11 according to embodiments of the present invention will be described in detail below with reference the drawings as appropriate.

Note that, in the drawings be presented below, members having the same function are denoted by the same reference sign. In this case, as a general rule, a redundant description will be omitted. Moreover, the sizes and shapes of the members may be changed or exaggerated and schematically illustrated for convenience of explanation.

[Basic Configuration Common to Electric Suspension Devices 11 According to Embodiments of the Present Invention]

Firstly, a basic configuration common to the electric suspension devices 11 according to the embodiments of the present invention will be described with reference to FIGS. 1 and 2.

FIG. 1 is a diagram of an entire configuration common to the electric suspension devices 11 according to the embodiments of the present invention. FIG. 2 is a partially cross-sectional view of an electromagnetic actuator 13 forming a part of the electric suspension devices 11.

As illustrated in FIG. 1, the electric suspension devices 11 according to the embodiments of the present invention includes a plurality of electromagnetic actuators 13 each provided for a wheel of a vehicle 10, and a load control ECU 15. The plurality of electromagnetic actuators 13 and the load control ECU 15 are connected to each other by respective power supply lines 14 (see the solid lines in FIG. 1) for supplying load control power from the load control ECU 15 to the plurality of electromagnetic actuators 13 and respective signal lines 16 (see the broken lines in FIG. 1) for sending load control signals for electric motors 31 (see FIG. 2) from the plurality of electromagnetic actuators 13 to the load control ECU 15.

In the present embodiments, a total of four electromagnetic actuators 13 are disposed, each for one of the front wheels (front left wheel and front right wheel) and the rear wheels (rear left wheel and rear right wheel). The loads of the electromagnetic actuators 13 provided for the respective wheels are controlled independently of each other for extension-contraction operations at the wheels.

In the embodiments of the present invention, the plurality of electromagnetic actuators 13 have a common configuration unless otherwise noted. Thus, the configuration of one electromagnetic actuator 13 will be described as a description of the plurality of electromagnetic actuators 13.

Figure 2:
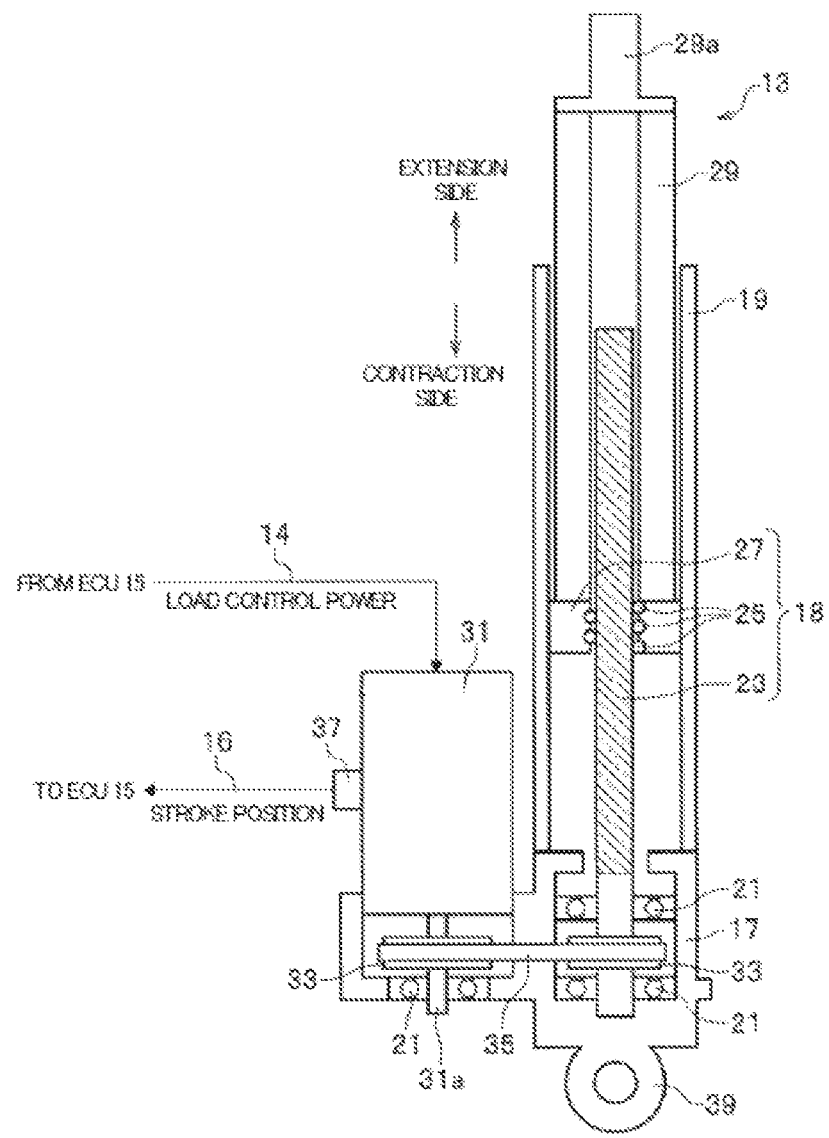
FIG. 2 is a partially cross-sectional view of an electromagnetic actuator included in the electric suspension devices according to the embodiments of the present invention.

As illustrated in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports the proximal end side of the ball screw shaft 23 via the ball bearing 21 such that the ball screw shaft 23 is rotatable about its axis. The outer tube 19 is provided on the base housing 17 and accommodates a ball screw mechanism 18 including the ball screw shaft 23, the plurality of balls 25, and the nut 27. The plurality of balls 25 roll along a screw groove on the ball screw shaft 23. The nut 27 is engaged with the ball screw shaft 23 via the plurality of balls 25 and converts a rotational motion of the ball screw shaft 23 into a linear motion. The inner tube 29, which is coupled to the nut 27, moves in the axial direction of the outer tube 19 together with the nut 27.

In order to transmit rotational driving force to the ball screw shaft 23, the electromagnetic actuator 13 includes an electric motor 31, a pair of pulleys 33, and a belt member 35, as illustrated in FIG. 2. The electric motor 31 is provided on the base housing 17 in parallel to the outer tube 19. The pulleys 33 are mounted on a motor shaft 31a of the electric motor 31 and the ball screw shaft 23, respectively. Around these pair of pulleys 33 is stretched the belt member 35 for transmitting the rotational driving force of the electric motor 31 to the ball screw shaft 23.

The electric motor 31 is provided with a resolver 37 that detects a rotational angle signal from the electric motor 31. The rotational angle signal from the electric motor 31 detected by the resolver 37 is sent to the load control ECU 15 via the signal line 16. The rotational driving of the electric motor 31 is controlled according to the load control power supplied from the load control ECU 15 to each of the plurality of the electromagnetic actuators 13 via the corresponding power supply line 14.

Note that the present embodiments employ the layout in which the motor shaft 31a of the electric motor 31 and the ball screw shaft 23 are disposed substantially parallel to each other and coupled to each other, as illustrated in FIG. 2, to shorten the axial dimension of the electromagnetic actuator 13. Alternatively, a layout may be employed in which the motor shaft 31a of the electric motor 31 and the ball screw shaft 23 are disposed coaxially with each other and coupled to each other. As illustrated in FIG. 2, the electromagnetic actuators 13 according to the embodiments of the present invention are provided with a coupling portion 39 at a lower end portion of the base housing 17. This coupling portion 39 is coupled and fixed to an unsprung member not illustrated (such as the lower arm or the knuckle on the wheel side). On the other hand, an upper end portion 29a of the inner tube 29 is coupled and fixed to a sprung member not illustrated (such as a strut tower portion on the body side).

In short, the electromagnetic actuator 13 is provided in parallel to a spring member not illustrated provided between the body and the wheel of the vehicle 10.

The electromagnetic actuator 13 configured as above operates as below. Specifically, consider a case where, for example, a thrust related to upward vibration is inputted into the coupling portion 39 from the wheel side of the vehicle 10. In this case, the inner tube 29 and the nut 27 try to descend together relative to the outer tube 19 receiving the thrust related to the upward vibration. In response to this, the ball screw shaft 23 tries to rotate in the direction corresponding to the descent of the nut 27. At this moment, the electric motor 31 is caused to generate a rotational driving force in the direction in which the rotational driving force impede the descent of the nut 27. This rotational driving force of the electric motor 31 is transmitted to the ball screw shaft 23 via the belt member 35.

By exerting a reaction force (damping force) on the ball screw shaft 23 against the thrust related to the upward vibration in this manner, the vibration trying to be transmitted from the wheel side to the body side is damped.

[Internal Configuration of Load Control ECU 15]

Next, configurations inside and around the load control ECU 15 included in the electric suspension device 11 according to an embodiment of the present invention will be described with reference to FIG. 3.

Figure 3:
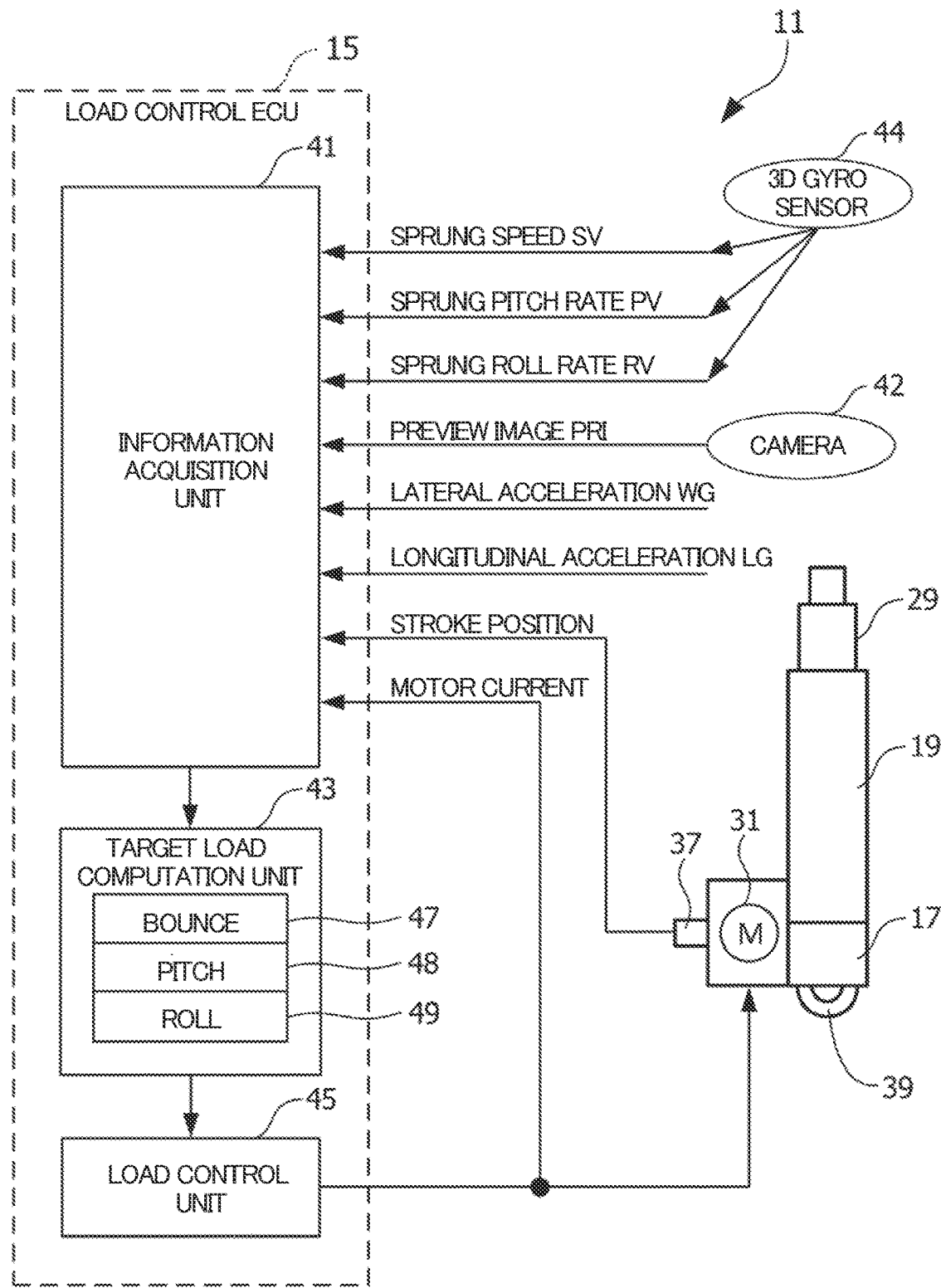
FIG. 3 is a diagram of configurations inside and around a load control electronic control unit, hereinafter referred to as a load control ECU, included in the electric suspension device according to an embodiment of the present invention.

FIG. 3 is a diagram of the configurations inside and around the load control ECU 15 included in the electric suspension device 11 according to the embodiment of the present invention.

[Electric Suspension Device 11 According to Embodiment of the Present Invention]

The load control ECU 15 included in the electric suspension device 11 according to an embodiment of the present invention includes a microcomputer that performs various arithmetic processes. The load control ECU 15 has a load control function of controlling the load of each of the plurality of electromagnetic actuators 13 based on the rotational angle signal from the electric motor 31 detected by the resolver 37, target loads, and so on to thereby generate a load for a damping operation and an extension-contraction operation of the electromagnetic actuator 13.

In order to implement this load control function, the load control ECU 15 includes an information acquisition unit 41, a target load computation unit 43, and a load control unit 45, as illustrated in FIG. 3.

As illustrated in FIG. 3, the information acquisition unit 41 acquires the rotational angle signal from the electric motor 31 detected by the resolver 37 as time-series information on the stroke position and also acquires information on a sprung speed SV by time-differentiating the time-series information on the stroke position. Note that the sprung speed SV is the speed of the sprung mass (body) in the vertical direction.

As illustrated in FIG. 3, the information acquisition unit 41 also acquires time-series information on each of a sprung pitch rate PV, a sprung roll rate RV, and a sprung acceleration SA. The information on the sprung pitch rate PV and the sprung roll rate RV may be acquired based on, for example, information from a 3D gyro sensor 44 provided in the vehicle 10, as illustrated in FIG. 3.

Note that the information on the sprung speed SV may be acquired based on the information from the 3D gyro sensor 44, as illustrated in FIG. 3.

The information acquisition unit 41 also acquires time-series information on a front road surface condition of a road surface in front of the vehicle 10 in the direction of advance as preview image information PRI. The preview image information PRI may be acquired, for example, based on image information captured by a camera 42 provided on the vehicle 10.

The camera 42 has an optical axis orientated toward the front side of the host vehicle and tilted obliquely downward, and has a function of capturing an image in the direction of advance of the host vehicle 10. In an example, a complementary metal oxide semiconductor (CMOS) camera, a charge coupled device (CCD) camera, or the like can be used as the camera 42 as appropriate. The camera 42 is provided near the rearview mirror inside the cabin of the host vehicle 10, or the like.

The preview image information PRI on the road surface in front of the host vehicle 10 captured by the camera 42 is sent to the information acquisition unit 41 of the load control ECU 15 through a communication medium.

As illustrated in FIG. 3, the information acquisition unit 41 further acquires time-series information on each of a lateral acceleration WG, a longitudinal acceleration LG, the stroke position of the electromagnetic actuator 13, and a motor current for the electric motor 31. The information on the lateral acceleration WG and the longitudinal acceleration LG may be acquired by a lateral acceleration sensor and a longitudinal acceleration sensor (neither of which is illustrated), respectively.

The pieces of information on the sprung speed SV, the sprung pitch rate PV, the sprung roll rate RV, the preview image PRI, the lateral acceleration WG, the longitudinal acceleration LG, the stroke position of the electromagnetic actuator 13, and the motor current for the electric motor 31 acquired by the information acquisition unit 41 are sent to the target load computation unit 43.

As illustrated in FIG. 3, the target load computation unit 43 has a function of figuring out target loads, which are target values for a damping operation and an extension-contraction operation of the electromagnetic actuator 13, by computation based on the various pieces of information acquired by the information acquisition unit 41.

The target load computation unit 43 also has a function of computing a target load based on the preview image information PRI acquired by the camera 42, and a function of computing a target load based on the sprung speed SV acquired by the 3D gyro sensor 44. These will be described later in detail.

Note that the target load computation unit 43 includes a bounce target value computation unit 47, a pitch target value computation unit 48, and a roll target value computation unit 49, as illustrated in FIG. 3.

The bounce target value computation unit 47 computes a bounce target value for controlling the bounce orientation of the vehicle 10 based the information on the sprung speed SV. The pitch target value computation unit 48 computes a pitch target value for controlling the pitch orientation of the vehicle 10 based on the information on the sprung pitch rate PV. The roll target value computation unit 49 computes a roll target value for controlling the roll orientation of the vehicle 10 based on the information on the sprung roll rate RV.

The load control unit 45 calculates a target current value that can achieve the target loads figured out by the target load computation unit 43. The load control unit 45 then controls the load on the electric motor 31 included in each of the plurality of electromagnetic actuators 13 such that the motor current for the electric motor 31 follows the target current value calculated. The loads on the electric motors 31 of the plurality of electromagnetic actuators 13 are controlled independently of each other.

The load control unit 45 has a plurality of load control modes to be used to control the load of each electromagnetic actuator 13. As the plurality of load control modes, prepared are, for example, a floating load control mode to be used in a case where the condition of the road surface in front of the vehicle 10 belongs to "floating", a jiggling load control mode to be used in a case where the condition of the road surface in front of the vehicle 10 belongs to "jiggling", and a harsh load control mode to be used in a case where the condition of the road surface in front of the vehicle 10 belongs to "harsh".

In the floating load control mode, control parameters are set as appropriate which are suitable for canceling out a "floating" vehicle body vibration in the case where the condition of the road surface in front of the vehicle 10 belongs to "floating".

In the jiggling load control mode, control parameters are set as appropriate which are suitable for canceling out a "jiggling" vehicle body vibration in the case where the condition of the road surface in front of the vehicle 10 belongs to "jiggling".

In the harsh load control mode, control parameters are set as appropriate which are suitable for canceling out a "harsh" vehicle body vibration in the case where the condition of the road surface in front of the vehicle 10 belongs to "harsh".

The load control unit 45 further has a preview load control mode in which load control is performed using the target load computed based on the preview image information PRI acquired by the camera 42, and a feedback load control mode in which load control is performed using the target load computed based on the sprung speed SV acquired by the 3D gyro sensor 44.

In the preview load control mode, control parameters are set as appropriate which are suitable for canceling out a vehicle body vibration in the case where load control is performed using the target load computed based on the preview image information PRI.

Similarly, in the feedback load control mode, control parameters are set as appropriate which are suitable for canceling out a vehicle body vibration in the case where load control is performed using the target load computed based on the sprung speed SV.

The preview load control mode is superior to the feedback load control mode in terms of control responsiveness. This is based, for example, on the fact that, while the feedback load control mode computes the target load based the sprung speed SV acquired by the 3D gyro sensor 44, the preview load control mode computes the target load based on the preview image information PRI on the front road surface acquired by the camera 42, and therefore the preview load control mode can acquire the target load in advance (early in time) as compared to the feedback load control mode.

[Configuration of Main Part of Load Control ECU 15 Included in Electric Suspension Device 11]

Next, an internal configuration of the load control ECU 15 included in the electric suspension device 11 according to an embodiment of the present invention will be described with reference to FIG. 4.

FIG. 4 is a diagram conceptually illustrating the internal configuration of the load control ECU 15 included in the electric suspension device 11 according to the embodiment of the present invention.

The load control ECU 15 included in the electric suspension device 11 includes a road surface data generation unit 51, a filter process unit 53, a road surface determination unit 55, a switch determination unit 59, and the above-described load control unit 45. The road surface data generation unit 51 and the filter process unit 53 correspond to the information acquisition unit 41. The road surface determination unit 55 and the switch determination unit 59 correspond to the target load computation unit 43.

The road surface data generation unit 51 generates road surface data including whether the road surface in front of the vehicle 10 is flat, is uneven, or does not have a step, based on the time-series information on the preview image PRI. The road surface data generation unit 51 also generates road surface data including whether the road surface in front of the vehicle 10 is flat, is uneven, or does not have a step, based on the time-series information on the sprung speed SV, the lateral acceleration WG, and the longitudinal acceleration LG.

The time-series information of the pieces of road surface data generated by the road surface data generation unit 51 is sent to the filter process unit 53 at the next stage.

The filter process unit 53 extracts pieces of road surface data with predetermined frequencies from the time-series information of the pieces of road surface data generated by the road surface data generation unit 51, in order to determine whether the road surface in front of the vehicle 10 is a rough road surface.

The pieces of road surface data extracted by the filter process unit 53, which belong to predetermined frequency ranges, are sent to the road surface determination unit 55 at the next stage.

Specifically, the filter process unit 53 includes a floating amplitude signal extraction unit 53a that extracts a signal with "floating amplitude", a jiggling amplitude signal extraction unit 53b that extracts a signal with "jiggling amplitude", and a harsh amplitude signal extraction unit 53c that extracts a signal with "harsh amplitude".

The floating amplitude signal extraction unit 53a performs a low-pass filter (LPF) process that extracts a "floating amplitude" signal component belonging to a first frequency range (which is, but not particularly limited to, about 0.1 to 2 Hz, for example) from the time-series information of the pieces of road surface data. As a result of the LPF process by the floating amplitude signal extraction unit 53a, a "floating amplitude" signal component belonging to the first frequency range, which is lower than the sprung resonance frequency, is extracted.

Meanwhile, in the Bode plot illustrated inside the floating amplitude signal extraction unit 53a, the horizontal axis represents frequencies and the vertical axis represents amplitudes (the same applies below).

The jiggling amplitude signal extraction unit 53b performs a band-pass filter (BPF) process that extracts a "jiggling amplitude" signal component belonging to a second frequency range (which is, but not particularly limited to, about 3 to 8 Hz, for example) from the time-series information of the pieces of road surface data. As a result of the BPF process by the jiggling amplitude signal extraction unit 53b, a "jiggling amplitude" signal component belonging to the second frequency range, which occupants feel sensitively, is extracted.

The harsh amplitude signal extraction unit 53c performs a high-pass filter (HPF) process that extracts a "harsh amplitude" signal component belonging to a third frequency range (which is, but not particularly limited to, about 4 Hz and higher, for example) from the time-series information of the pieces of road surface data. As a result of the HPF process by the harsh amplitude signal extraction unit 53c, a "harsh amplitude" signal component belonging to the third frequency range, which appears in the vehicle body when the vehicle runs over a joint or a crack in a paved road, a bump, or a step, is extracted.

The road surface determination unit 55 determines which one or ones of "floating", "jiggling", and "harsh" the condition of the road surface in front of the vehicle 10 belongs to, based on the time-series information on the signal components in the pieces of road surface data classified by the three frequency ranges for "floating amplitude", "jiggling amplitude", and "harsh amplitude" by the filter process unit 53.

Specifically, the road surface determination unit 55 includes a floating determination unit 55a that determines whether the condition of the road surface in front of the vehicle 10 belongs to "floating", a jiggling determination unit 55b that determines whether the front road surface condition belongs to "jiggling", and a harsh determination unit 55c that determines whether the front road surface condition belongs to "harsh".

The floating determination unit 55a determines whether the condition of the road surface in front of the vehicle 10 belongs to "floating", based on the "floating amplitude" signal component extracted by the floating amplitude signal extraction unit 53a, which belongs to the first frequency range. Specifically, the floating determination unit 55a makes a floating determination as to whether the magnitude of the "floating amplitude" signal component is greater than a first threshold value. If the magnitude of the "floating amplitude" signal component is greater than the first threshold value, the floating determination unit 55a determines that the condition of the road surface in front of the vehicle 10 belongs to "floating".

The jiggling determination unit 55b determines whether the condition of the road surface in front of the vehicle 10 belongs to "jiggling", based on the "jiggling amplitude" signal component extracted by the jiggling amplitude signal extraction unit 53b, which belongs to the second frequency range. Specifically, the jiggling determination unit 55b makes a jiggling determination as to whether the magnitude of the "jiggling amplitude" signal component is greater than a second threshold value. If the magnitude of the "jiggling amplitude" signal component is greater than the second threshold value, the jiggling determination unit 55b determines that the condition of the road surface in front of the vehicle 10 belongs to "jiggling".

The harsh determination unit 55c determines whether the condition of the road surface in front of the vehicle 10 belongs to "harsh", based on the "harsh amplitude" signal component extracted by the harsh amplitude signal extraction unit 53c, which belongs to the third frequency range. Specifically, the harsh determination unit 55c makes a harsh determination as to whether the magnitude of the "harsh amplitude" signal component is greater than a third threshold value. If the magnitude of the "harsh amplitude" signal component is greater than the third threshold value, the harsh determination unit 55c determines that the condition of the road surface in front of the vehicle 10 belongs to "harsh".

The results of the determinations by the road surface determination unit 55 are sent to a road surface flag setting unit 57 at the next stage.

The road surface flag setting unit 57 sets a road surface flag(s) based on the results of the determinations by the floating determination unit 55a, the jiggling determination unit 55b, and the harsh determination unit 55c belonging to the road surface determination unit 55.

Specifically, the road surface flag setting unit 57 sets a "floating" road surface flag in the case where the floating determination unit 55a has determined that the condition of the road surface in front of the vehicle 10 belongs to "floating".

The road surface flag setting unit 57 sets a "jiggling" road surface flag in the case where the jiggling determination unit 55b has determined that the condition of the road surface in front of the vehicle 10 belongs to "jiggling".

The road surface flag setting unit 57 sets a "harsh" road surface flag in the case where the harsh determination unit 55c has determined that the condition of the road surface in front of the vehicle 10 belongs to "harsh".

The road surface flag(s) set by the road surface flag setting unit 57 is(are) sent to the switch determination unit 59 at the next stage.

The switch determination unit 59 determines whether it is possible to switch the load control mode to be used to control the load of the electromagnetic actuator 13, based on the content of the road surface flag(s) set by the road surface flag setting unit 57.

Specifically, in a case where the road surface flag setting unit 57 has set at least one road surface flag among the "floating" road surface flag, the "jiggling" road surface flag, and the "harsh" road surface flag, the switch determination unit 59 determines whether it is possible to switch to the load control mode corresponding to the type of the set road surface flag. This determination of whether it is possible to switch the load control mode according to the content of the set road surface flag will also be referred to as the first switch determination for convenience.

Specifically, in the case where, for example, the road surface flag setting unit 57 has set the "floating" road surface flag, the switch determination unit 59 determines that it is possible to switch the current load control mode to the above-described floating load control mode corresponding to the "floating" road surface flag.

In the case where the road surface flag setting unit 57 has set the "jiggling" road surface flag, the switch determination unit 59 determines that it is possible to switch the current load control mode to the above-described jiggling load control mode corresponding to the "jiggling" road surface flag.

In the case where the road surface flag setting unit 57 has set the "harsh" road surface flag, the switch determination unit 59 determines that it is possible to switch the current load control mode to the above-described harsh load control mode corresponding to the "harsh" road surface flag.

The switch determination unit 59 also determines whether it is possible to switch the load control mode to be used to control the load of the electromagnetic actuator 13, based on the sprung speed SV, the lateral acceleration WG, and the longitudinal acceleration LG acquired by the information acquisition unit 41.

Specifically, the switch determination unit 59 determines whether it is possible to switch the load control mode, based on whether a switch ability condition that the behavior of the sprung mass (vehicle body) is calm, the vehicle 10 is practically not accelerating or decelerating, and the vehicle 10 is advancing straight is satisfied. As long as such a switch ability condition is satisfied, the probability that switching the load control mode gives a sense of strangeness to the occupant is considered low. The determination of whether it is possible to switch the load control mode according to the switch ability condition will also be referred to as the second switch determination for convenience.

Specifically, the switch determination unit 59 determines that it is possible to switch the current load control mode to another load control mode, in a case where a switch ability condition that the sprung speed SV is a predetermined speed threshold value SVth or less, the lateral acceleration WG is a predetermined lateral acceleration threshold value WGth or less, and the longitudinal acceleration LG is a predetermined longitudinal acceleration threshold value LGth or less is satisfied.

Note that, as the predetermined speed threshold value SVth, a value suitable for determining whether the behavior of the sprung mass (vehicle body) is calm is set as appropriate.

As the predetermined lateral acceleration threshold value WGth, a value suitable for determining whether the vehicle 10 is advancing straight is set as appropriate.

As the predetermined longitudinal acceleration threshold value LGth, a value suitable for determining whether or not the vehicle 10 is accelerating or decelerating is set as appropriate.

The result of the switch ability determination by the switch determination unit 59 is sent to the load control unit 45 at the next stage.

The load control unit 45 controls the load of the electromagnetic actuator 13 by using the predetermined load control mode corresponding to the result of the switch ability determination by the switch determination unit 59.

Specifically, in the case where the switch determination unit 59 has determined that it is not possible to switch the load control mode, the load control unit 45 maintains the current load control mode and controls the load of the electromagnetic actuator 13.

On the other hand, in the case where the switch determination unit 59 has determined that it is possible to switch the load control mode, the load control unit 45 switches the current load control mode to a necessary load control mode and controls the load of the electromagnetic actuator 13 by using the switched load control mode. [Operation of Electric suspension device 11]

Figure 5A:
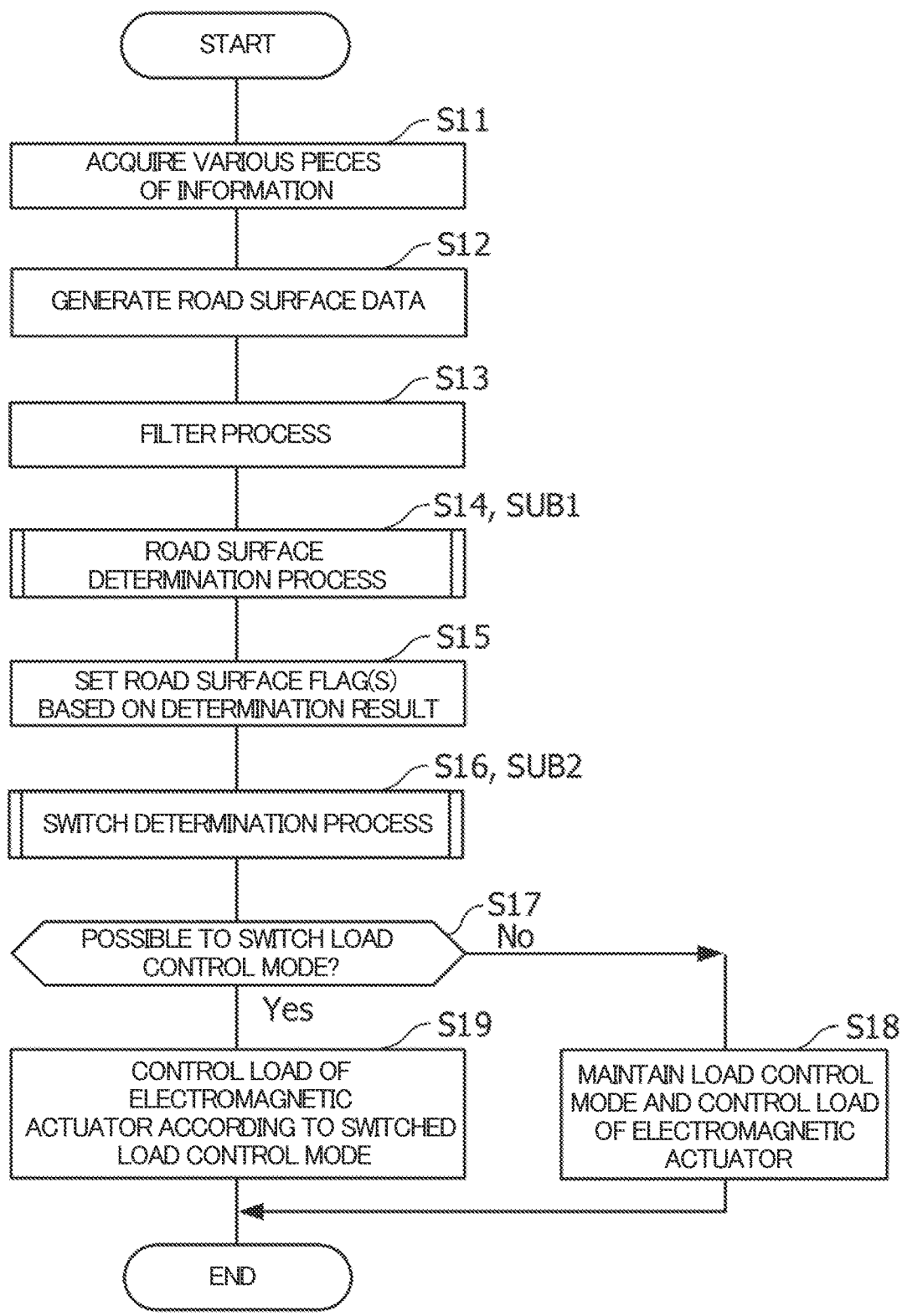
FIG. 5A is a flowchart to be used to describe operation of the electric suspension device according to an embodiment of the present invention.
Figure 5D:
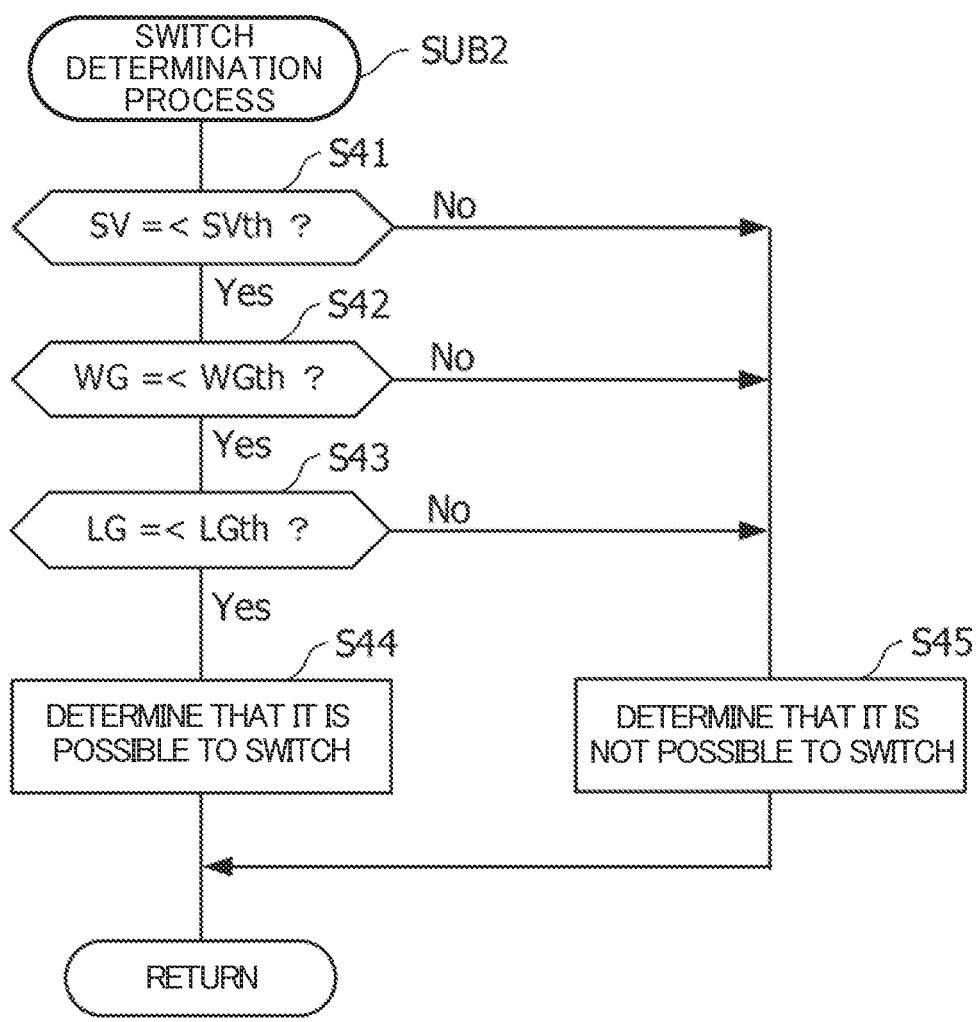
FIG. 5D is a flowchart to be used to describe operations in the switch determination process illustrated in FIG. 5A.

Next, operation of the electric suspension device 11 according to an embodiment of the present invention will be described with reference to FIGS. 5A to 5D. FIG. 5A is a flowchart to be used to describe the operation of the electric suspension device 11 according to the embodiment of the present invention. FIGS. 5B and 5C are flowcharts to be used to describe operations in the road surface determination process (SUB1) illustrated in FIG. 5A. FIG. 5D is a flowchart to be used to describe operations in the switch determination process (SUB2) illustrated in FIG. 5A.

In step S11 illustrated in FIG. 5A, the information acquisition unit 41 of the load control ECU 15 acquires various pieces of information including the sprung speed SV, the sprung pitch rate PV, the sprung roll rate RV, the preview image PRI, the lateral acceleration WG, the longitudinal acceleration LG, the stroke position of each electromagnetic actuator 13, and the motor current for the electric motor 31.

In step S12, the road surface data generation unit 51 belonging to the information acquisition unit 41 of the load control ECU 15 generates road surface data including information on whether the road surface in front of the vehicle 10 is flat, is uneven, or does not have a step, based on the time-series information on the preview image PRI or the sprung speed SV.

In step S13, the filter process unit 53 belonging to the information acquisition unit 41 of the load control ECU 15 extracts pieces of road surface data with predetermined frequencies from the time-series information of the road surface data generated by the road surface data generation unit 51, in order to determine whether the road surface in front of the vehicle 10 is a rough road surface.

Specifically, the floating amplitude signal extraction unit 53a performs the LPF process, which extracts the "floating amplitude" signal component belonging to the first frequency range (which is, but not particularly limited to, about 0.1 to 2 Hz, for example) from the time-series information of the road surface data.

The jiggling amplitude signal extraction unit 53b performs the BPF process, which extracts the "jiggling amplitude" signal component belonging to the second frequency range (which is, but not particularly limited to, about 3 to 8 Hz, for example) from the time-series information of the road surface data.

The harsh amplitude signal extraction unit 53c performs the HPF process, which extracts the "harsh amplitude" signal component belonging to the third frequency range (which is, but not particularly limited to, about 4 Hz and higher, for example) from the time-series information of the road surface data.

In step S14, the road surface determination unit 55 belonging to the target load computation unit 43 of the load control ECU 15 determines which one or ones of "floating", "jiggling", and "harsh" the condition of the road surface in front of the vehicle 10 belongs to, based on the time-series information on the signal components in the pieces of road surface data classified by the three frequency ranges for "floating amplitude", "jiggling amplitude", and "harsh amplitude" by the filter process unit 53.

Now, the road surface determination process (SUB1) illustrated in step S14 will be described with reference to FIGS. 5B and 5C.

In step S21 in the road surface determination process (SUB1) illustrated in FIG. 5B, the road surface determination unit 55 belonging to the target load computation unit 43 of the load control ECU 15 determines whether the result of a road surface determination based on the preview image information PRI is "floating" (PRI: "floating"?).

If the result of the determination in step S21 indicates that the result of the road surface determination based on the preview image information PRI is "floating" (Yes in step S21), the load control ECU 15 causes the process flow to advance to a terminal 1 (see FIG. 5C).

If, on the other hand, the result of the determination in step S21 indicates that the result of the road surface determination based on the preview image information PRI is not "floating" (No in step S21), the load control ECU 15 causes the process flow to advance to the next step S22.

In step S22, the road surface determination unit 55 belonging to the target load computation unit 43 of the load control ECU 15 determines whether the result of the road surface determination based on the preview image information PRI is "jiggling" (PRI: "jiggling"?).

If the result of the determination in step S22 indicates that the result of the road surface determination based on the preview image information PRI is "jiggling" (Yes in step S22), the load control ECU 15 causes the process flow to advance to the next step S23.

If, on the other hand, the result of the determination in step S22 indicates that the result of the road surface determination based on the preview image information PRI is not "jiggling" (No in step S22), the load control ECU 15 causes the process flow to jump to step S24.

In step S23, the road surface determination unit 55 belonging to the target load computation unit 43 of the load control ECU 15 determines that the road surface in front of the vehicle 10 is a "jiggling" road surface, on the basis of the result of the road surface determination based on the preview image information PRI in step S22. Thereafter, the load control ECU 15 returns the process flow to the main routine illustrated in FIG. 5A.

In step S24, the road surface determination unit 55 belonging to the target load computation unit 43 of the load control ECU 15 determines whether the result of a road surface determination based on sensor detection information GYR from the 3D gyro sensor 44 or the like is "jiggling" (GYR: "jiggling"?).

If the result of the determination in step S24 indicates that the result of the road surface determination based on the sensor detection information GYR is "jiggling" (Yes in step S24), the load control ECU 15 causes the process flow to advance to step S23.

If, on the other hand, the result of the determination in step S24 indicates that the result of the road surface determination based on the sensor detection information GYR is not "jiggling" (No in step S24), the load control ECU 15 causes the process flow to advance to the next step S25.

In step S25, the road surface determination unit 55 belonging to the target load computation unit 43 of the load control ECU 15 determines whether the result of the road surface determination based on the preview image information PRI is "harsh" (PRI: "harsh"?).

If the result of the determination in step S25 indicates that the result of the road surface determination based on the preview image information PRI is "harsh" (Yes in step S25), the load control ECU 15 causes the process flow to advance to the next step S26.

If, on the other hand, the result of the determination in step S25 indicates that the result of the road surface determination based on the preview image information PRI is not "harsh" (No in step S25), the load control ECU 15 causes the process flow to jump to step S27.

In step S26, the road surface determination unit 55 belonging to the target load computation unit 43 of the load control ECU 15 determines that the road surface in front of the vehicle 10 is a road surface with a combination of "flat" and "harsh", on the basis of the result of the road surface determination based on the preview image information PRI in step S25. Thereafter, the load control ECU 15 returns the process flow to the main routine illustrated in FIG. 5A.

In step S27, the road surface determination unit 55 belonging to the target load computation unit 43 of the load control ECU 15 determines that the road surface in front of the vehicle 10 is a "flat" road surface, on the basis of the result of the road surface determination based on the preview image information PRI in step S25. Thereafter, the load control ECU 15 returns the process flow to the main routine illustrated in FIG. 5A.

Now, in step S31 illustrated in FIG. 5C, which originates from the terminal 1, the road surface determination unit 55 belonging to the target load computation unit 43 of the load control ECU 15 determines whether the result of the road surface determination based on the preview image information PRI is "jiggling" (PRI: "jiggling"?).

If the result of the determination in step S31 indicates that the result of the road surface determination based on the preview image information PRI is "jiggling" (Yes in step S31), the load control ECU 15 causes the process flow to advance to the next step S32.

If, on the other hand, the result of the determination in step S31 indicates that the result of the road surface determination based on the preview image information PRI is not "jiggling" (No in step S31), the load control ECU 15 causes the process flow to jump to step S33.

In step S32, the road surface determination unit 55 belonging to the target load computation unit 43 of the load control ECU 15 determines that the road surface in front of the vehicle 10 is a road surface with a combination of "floating" and "jiggling", on the basis of the result of the road surface determination based on the preview image information PRI in step S31. Thereafter, the load control ECU 15 returns the process flow to the main routine illustrated in FIG. 5A.

In step S33, the road surface determination unit 55 belonging to the target load computation unit 43 of the load control ECU 15 determines whether the result of the road surface determination based on the sensor detection information GYR is "jiggling" (GYR: "jiggling"?).

If the result of the determination in step S33 indicates that the result of the road surface determination based on the sensor detection information GYR is "jiggling" (Yes in step S33), the load control ECU 15 causes the process flow to advance to step S32.

If, on the other hand, the result of the determination in step S33 indicates that the result of the road surface determination based on the sensor detection information GYR is not "jiggling" (No in step S33), the load control ECU 15 causes the process flow to advance to the next step S34.

In step S34, the road surface determination unit 55 belonging to the target load computation unit 43 of the load control ECU 15 determines whether the result of the road surface determination based on the preview image information PRI is "harsh" (PRI: "harsh"?).

If the result of the determination in step S34 indicates that the result of the road surface determination based on the preview image information PRI is "harsh" (Yes in step S34), the load control ECU 15 causes the process flow to advance to the next step S35.

If, on the other hand, the result of the determination in step S34 indicates that the result of the road surface determination based on the preview image information PRI is not "harsh" (No in step S34), the load control ECU 15 causes the process flow to jump to step S36.

In step S35, the road surface determination unit 55 belonging to the target load computation unit 43 of the load control ECU 15 determines that the road surface in front of the vehicle 10 is a road surface with a combination of "floating" and "harsh", on the basis of the result of the road surface determination based on the preview image information PRI in step S34. Thereafter, the load control ECU 15 returns the process flow to the main routine illustrated in FIG. 5A.

In step S36, the road surface determination unit 55 belonging to the target load computation unit 43 of the load control ECU 15 determines that the road surface in front of the vehicle 10 is a "floating" road surface, on the basis of the result of the road surface determination based on the preview image information PRI in step S34. Thereafter, the load control ECU 15 returns the process flow to the main routine illustrated in FIG. 5A.

Now, the description will be continued referring back to the main routine in FIG. 5A.

In step S15 illustrated in FIG. 5A, the road surface flag setting unit 57 belonging to the target load computation unit 43 of the load control ECU 15 sets a road surface flag(s) based on the results of the determinations by the floating determination unit 55a, the jiggling determination unit 55b, and the harsh determination unit 55c belonging to the road surface determination unit 55.

Specifically, the road surface flag setting unit 57 sets the "floating" road surface flag in the case where the floating determination unit 55a determines that the condition of the road surface in front of the vehicle 10 belongs to "floating".

The road surface flag setting unit 57 sets the "jiggling" road surface flag in the case where the jiggling determination unit 55b determines that the condition of the road surface in front of the vehicle 10 belongs to "jiggling".

The road surface flag setting unit 57 sets the "harsh" road surface flag in the case where the harsh determination unit 55c determines that the condition of the road surface in front of the vehicle 10 belongs to "harsh".

In step S16, the switch determination unit 59 belonging to the target load computation unit 43 of the load control ECU 15 determines whether it is possible to switch the load control mode to be used to control the load of the electromagnetic actuator 13, based on the content of the road surface flag(s) set by the road surface flag setting unit 57.

The switch determination unit 59 belonging to the target load computation unit 43 of the load control ECU 15 also determines whether it is possible to switch the load control mode to be used to control the load of the electromagnetic actuator 13, based on the sprung speed SV, the lateral acceleration WG, and the longitudinal acceleration LG acquired by the information acquisition unit 41.

Now, the switch determination process (SUB2) illustrated in step S16 will be described with reference to FIG. 5D.

In step S41 in the switch determination process (SUB2) illustrated in FIG. 5D, the switch determination unit 59 belonging to the target load computation unit 43 of the load control ECU 15 determines whether or not the sprung speed SV is the predetermined speed threshold value SVth or less.

If the result of the determination in step S41 indicates that the sprung speed SV is the predetermined speed threshold value SVth or less (Yes in step S41), the load control ECU 15 causes the process flow to advance to the next step S42.

If, on the other hand, the result of the determination in step S41 indicates that the sprung speed SV is greater than the predetermined speed threshold value SVth (No in step S41), the load control ECU 15 causes the process flow to jump to step S45.

In step S42, the switch determination unit 59 belonging to the target load computation unit 43 of the load control ECU 15 determines whether or not the lateral acceleration WG is the predetermined lateral acceleration threshold value WGth or less.

If the result of the determination in step S42 indicates that the lateral acceleration WG is the predetermined lateral acceleration threshold value WGth or less (Yes in step S42), the load control ECU 15 causes the process flow to advance to the next step S43.

If, on the other hand, the result of the determination in step S42 indicates that the lateral acceleration WG is greater than the predetermined lateral acceleration threshold value WGth (No in step S42), the load control ECU 15 causes the process flow to jump to step S45.

In step S43, the switch determination unit 59 belonging to the target load computation unit 43 of the load control ECU 15 determines whether or not the longitudinal acceleration LG is the predetermined longitudinal acceleration threshold value LGth or less.

If the result of the determination in step S43 indicates that the longitudinal acceleration LG is the predetermined longitudinal acceleration threshold value LGth or less (Yes in step S43), the load control ECU 15 causes the process flow to advance to the next step S44.

If, on the other hand, the result of the determination in step S43 indicates that the longitudinal acceleration LG is greater than the predetermined longitudinal acceleration threshold value LGth (No in step S43), the load control ECU 15 causes the process flow to jump to step S45.

In step S44, the switch determination unit 59 belonging to the target load computation unit 43 of the load control ECU 15 determines that it is possible to switch the current load control mode to another load control mode. Thereafter, the load control ECU 15 returns the process flow to the main routine illustrated in FIG. 5A.

In step S45, the switch determination unit 59 belonging to the target load computation unit 43 of the load control ECU 15 determines that it is not possible to switch the current load control mode to another load control mode. Thereafter, the load control ECU 15 returns the process flow to the main routine illustrated in FIG. 5A.

Now, the description will be continued referring back to the main routine in FIG. 5A.

In step S17 illustrated in FIG. 5A, the switch determination unit 59 belonging to the target load computation unit 43 of the load control ECU 15 determines whether it is possible to switch the current load control mode.

If the result of the determination in step S17 indicates that it is not possible to switch the current load control mode (No in step S17), the load control ECU 15 causes the process flow to advance to the next step S18.

If, on the other hand, the result of the determination in step S17 indicates that it is possible to switch the current load control mode (Yes in step S17), the load control ECU 15 causes the process flow to jump to step S19.

In step S18, the load control unit 45 of the load control ECU 15 maintains the current load control mode and controls the load of the electromagnetic actuator 13. Thereafter, the load control ECU 15 terminates the flow of the series of processes.

In step S19, on the other hand, the load control unit 45 of the load control ECU 15 switches the load control mode to another load control mode and controls the load of the electromagnetic actuator 13 by using the switched load control mode. Thereafter, the load control ECU 15 terminates the flow of the series of processes.

[Operation and Advantageous Effects of Electric Suspension Devices 11 According to Embodiments of the Present Invention]

An electric suspension device 11 based on a first aspect is, as a premise, an electric suspension device 11 including an actuator (electromagnetic actuator 13) that is provided between a body and a wheel of a vehicle 10 and generates a load for damping vibration of the body.

The electric suspension device 11 based on the first aspect includes: a road surface condition detection unit (camera 42) that detects a front road surface condition (preview image information PRI) of a front road surface in front of the vehicle 10; a sprung state amount detection unit (3D gyro sensor 44) that detects sprung state amounts (sprung speed SV) of a sprung mass of the vehicle 10; a target load computation unit 43 that computes a target load based on the preview image information PRI and the sprung speed SV; and a load control unit 45 that controls the load of the electromagnetic actuator 13 by using the target load computed by the target load computation unit 43.

In a case where information indicating that the front road surface is even is acquired as a detection result based on the preview image information PRI detected by the camera 42 but information indicating that the front road surface is uneven is acquired as a detection result based on the sprung speed SV detected by the 3D gyro sensor 44, the target load computation unit 43 computes the target load based on the sprung speed SV. The load control unit 45 performs load control using the computed target load.

The electric suspension device disclosed in Japanese Patent Application Publication No. 2017-171156 performs control that damps vibration of a vehicle body based on the result of detection of the road surface condition by a preview sensor, without detecting a vibration state of the vehicle body such as the relative speed between the vehicle body and each wheel.

For this reason, if the result of the detection of the road surface condition contains an error, there is a possibility of not only failing to damp vibration of the vehicle body but, conversely, increasing the vibration of the vehicle body. Consequently, the ride quality of the vehicle may be deteriorated, as opposed to the expectation.

To solve this, the electric suspension device 11 based on the first aspect is configured such that in the case where information indicating that the front road surface is even is acquired as the detection result based on the preview image information PRI detected by the camera 42 but information indicating that the front road surface is uneven is acquired as the detection result based on the sprung speed SV detected by the 3D gyro sensor 44, the target load computation unit 43 computes the target load based on the sprung speed SV, and the load control unit 45 performs load control using the computed target load.

According to the electric suspension device 11 based on the first aspect, even if the detection result based on the preview image information PRI detected by the camera 42 contains an error, in the case where information indicating that the front road surface is uneven is acquired as the detection result based on the sprung speed SV detected by the 3D gyro sensor 44, the target load is computed based on the sprung speed SV, and the load control using the computed target load is performed. This makes it possible to maintain the ride quality of the vehicle 10 comfortable.

Also, an electric suspension device 11 based on a second aspect is the electric suspension device 11 based on the first aspect, and may be configured such that in a case where the target load computation unit 43 has computed the target load based on the sprung speed SV, the load control unit 45 controls the load of the electromagnetic actuator 13 so as to bring a current target load gradually closer to the computed target load before controlling the load of the electromagnetic actuator 13 by using the target load.

In the case where information indicating that the front road surface is even is acquired as the detection result based on the preview image information PRI detected by the camera 42 but information indicating that the front road surface is uneven is acquired as the detection result based on the sprung speed SV detected by the 3D gyro sensor 44, the target load computation unit 43 computes the target load based on the sprung speed SV. The load control unit 45 performs load control using the computed target load.

In this case, the load control unit 45 switches the target load to use the computed target load, instead of using the current target load, which is based on the preview image information PRI indicating that the front road surface is even.

Now, an example of switching a first target load (current) based on a first load control mode to a second target load (switched) based on a second load control mode will be described with reference to FIGS. 6A and 6B.

FIGS. 6A and 6B are time charts to be used to describe operation of the electric suspension device according to an embodiment of the present invention. FIG. 6A is a time chart illustrating time-series changes in the first and second target loads. FIG. 6B is a time chart illustrating time-series changes of a switch flag indicating a state of switching the target load.

FIG. 6A exemplarily illustrates a case of switching the first target load (current) based on the first load control mode to the second target load (switched) based on the second load control mode.

From a time t0 to immediately before a time t1 and from a time t3, the switch flag is set in a non-switchable state. On the other hand, in the period from the time t1 to a time t3, the switch flag is set in a switchable state.

At the time t1, the state of the switch flag transitions from the non-switchable state to the switchable state. Here, in comparison between the magnitudes of the first and second target loads at the time t1, the first target load is greater than the second target load. If the current first target load and the second target load computed based on the sprung speed SV differ in magnitude as above, switching the target load will give a sense of strangeness to the occupant.

To solve this, the electric suspension device is configured to control the load of the electromagnetic actuator 13 so as to bring the current target load (first target load) gradually closer to the second target load computed based on the sprung speed SV (see the characteristic curve of a third target load in FIG. 6A) in a switch period from the time t1 to a time t2 (see FIGS. 6A and 6B), before controlling the load of the electromagnetic actuator 13 by using the second target load.

At the time t3, the state of the switch flag transitions from the switchable state to the non-switchable state. At the time t3, the second target load is switched to the first target load, as opposed to the above-described example at the time t1.

Here, in comparison between the magnitudes of the first and second target loads at the time t3, the first target load is greater than the second target load. If the first target load and the second target load computed based on the sprung speed SV differ in magnitude as above, switching the target load will give a sense of strangeness to the occupant.

To solve this, the electric suspension device is configured to control the load of the electromagnetic actuator 13 so as to bring the current target load gradually closer to the first target load (see the characteristic curve of the third target load in FIG. 6A) in a switch period from the time t3 to a time t4 (see FIGS. 6A and 6B), when switching the second target load to the first target load.

In sum, the electric suspension device 11 based on the second aspect is configured such that in the case where the target load computation unit 43 has computed the target load based on the sprung speed SV, the load control unit 45 controls the load of the electromagnetic actuator 13 so as to bring the current target load gradually closer to the computed target load before controlling the load of the electromagnetic actuator 13 by using the target load.

According to the electric suspension device 11 based on the second aspect, in the case where the target load computation unit 43 has computed the target load based on the sprung speed SV, the load control unit 45 controls the load of the electromagnetic actuator 13 so as to bring the current target load gradually closer to the computed target load before controlling the load of the electromagnetic actuator 13 by using the target load. Thus, as compared to the electric suspension device 11 based on the first aspect, the electric suspension device 11 based on the second aspect can smoothly switch the target load without giving a sense of strangeness to the occupant.

Also, an electric suspension device 11 based on a third aspect is the electric suspension device 11 based on the first or second aspect, and may be configured such that the sprung state amounts include a sprung speed SV, and in the case where information indicating that the front road surface is even is acquired as the detection result based on the preview image information PRI detected by the camera 42 but information indicating that the front road surface is uneven is acquired as the detection result based on the sprung speed SV detected by the 3D gyro sensor 44, the target load computation unit 43 computes the target load based on the sprung speed SV among the sprung state amounts only if the sprung speed SV is a predetermined speed threshold value SVth or less.

As described earlier, if the current target load and the computed target load differ in magnitude, switching the target load will give a sense of strangeness to the occupant.

To solve this, the electric suspension device 11 based on the third aspect is configured such that in the case where information indicating that the front road surface is even is acquired as the detection result based on the preview image information PRI detected by the camera 42 but information indicating that the front road surface is uneven is acquired as the detection result based on the sprung speed SV detected by the 3D gyro sensor 44, the target load computation unit 43 computes the target load based on the sprung speed SV among the sprung state amounts and the load control unit 45 performs load control using the computed target load only if the sprung speed SV is the predetermined speed threshold value SVth or less.

According to the electric suspension device 11 based on the third aspect, in the case where information indicating that the front road surface is even is acquired as the detection result based on the preview image information PRI detected by the camera 42 but information indicating that the front road surface is uneven is acquired as the detection result based on the sprung speed SV detected by the 3D gyro sensor 44, the target load computation unit 43 computes the target load based on the sprung speed SV among the sprung state amounts and the load control unit 45 performs the load control using the computed target load only if the sprung speed SV is the predetermined speed threshold value SVth or less. Thus, as with the electric suspension device 11 based on the second aspect, the electric suspension device 11 based on the third aspect can smoothly switch the target load without giving a sense of strangeness to the occupant.

Also, an electric suspension device 11 based on a fourth aspect is the electric suspension device 11 based on the third aspect, further including an information acquisition unit 41 that acquires information on whether the vehicle 10 is making a turn and information on whether an acceleration or deceleration operation is performed in the vehicle 10.

In the case where information indicating that the front road surface is even is acquired as the detection result based on the preview image information PRI detected by the camera 42 but information indicating that the front road surface is uneven is acquired as the detection result based on the sprung speed SV detected by the 3D gyro sensor 44, the target load computation unit 43 computes the target load based on the sprung speed SV only if the vehicle 10 is advancing straight and an acceleration or deceleration operation is not performed in the vehicle 10.

According to the electric suspension device 11 based on the fourth aspect, in the case where information indicating that the front road surface is even is acquired as the detection result based on the preview image information PRI detected by the camera 42 but information indicating that the front road surface is uneven is acquired as the detection result based on the sprung speed SV detected by the 3D gyro sensor 44, the target load is computed based on the sprung speed SV and load control using the computed target load is performed only if the vehicle 10 is advancing straight and an acceleration or deceleration operation is not performed in the vehicle 10. Thus, as with the electric suspension device 11 based on the third aspect, the electric suspension device 11 based on the fourth aspect can smoothly switch the target load without giving a sense of strangeness to the occupant.

Also, an electric suspension device 11 based on a fifth aspect is the electric suspension devices 11 based on the first to fourth aspects, in which in a case where the target load computation unit 43 has computed the target load based on the sprung speed SV and, while the load control unit 45 is controlling the load of the electromagnetic actuator 13 by using the computed target load, information indicating that the front road surface is uneven is acquired as the detection result based on the preview image information PRI detected by the camera 42, the load control unit 45 continues controlling the load of the electromagnetic actuator 13 by using the computed target load.

It has been found that the accuracy of the detection result based on the preview image information PRI detected by the camera 42 tends to remain lower under some weather conditions such as rain and fog and some image capturing environments such as nighttime, for example.

To address this, the electric suspension device 11 based on the fifth aspect is configured such that in the case where information indicating that the front road surface is uneven is acquired as the detection result based on the preview image information PRI while the load of the electromagnetic actuator 13 is being controlled by using the target load computed based on the sprung speed SV, the load control unit 45 continues controlling the load of the electromagnetic actuator 13 by using the computed target load.

In this way, the load control is not performed using the target load based on the preview image information PRI when a decrease in the accuracy of the detection result based on the preview image information PRI is concerned.

According to the electric suspension device 11 based on the fifth aspect, in the case where information indicating that the front road surface is uneven is acquired as the detection result based on the preview image information PRI while the load of the electromagnetic actuator 13 is being controlled by using the target load computed based on the sprung speed SV, the reliability of that detection result is assumed to be low, and load control using the target load based on the preview image information PRI is prevented from being performed.

In this case, instead of controlling the load of the electromagnetic actuator 13 by using the target load based on the preview image information PRI, whose reliability is assumed to be low, the load control using the target load computed based on the sprung speed SV, which is more reliable, is continued.

Thus, the electric suspension device 11 based on the fifth aspect can maintain the ride quality of the vehicle 10 more comfortable than the electric suspension devices 11 based on the first to fourth aspects.

Also, an electric suspension device 11 based on a sixth aspect is the electric suspension device 11 based on the fifth aspect, in which in a case where the target load computation unit 43 has computed the target load based on the sprung speed SV detected by the 3D gyro sensor 44 and the load control unit 45 is controlling the load of the electromagnetic actuator 13 by using the computed target load, then if information indicating that the front road surface is even is acquired as the detection result based on the sprung speed SV detected by the 3D gyro sensor 44 and thereafter information indicating that the front road surface is uneven is acquired as the detection result based on the preview image information PRI detected by the camera 42, the target load computation unit 43 computes the target load based on the preview image information PRI. The load control unit 45 controls the load of the electromagnetic actuator 13 by using the computed target load.

Here, the case where the target load has been computed based on the sprung speed SV detected by the 3D gyro sensor 44 and the load control unit 45 is controlling the load of the electromagnetic actuator 13 by using the computed target load occurs after information indicating that the front road surface is even is acquired as the detection result based on the preview image information PRI detected by the camera 42.

Also, as mentioned earlier, it has been found that the accuracy of the detection result based on the preview image information PRI detected by the camera 42 tends to remain lower under some weather conditions such as rain and fog and some image capturing environments such as nighttime, for example.

In such cases, even when information indicating that the front road surface is uneven is acquired as the detection result based on the preview image information PRI detected by the camera 42, the target load is not computed based on the preview image information PRI and load control is not performed using the computed target load.

In view of ensuring the accuracy of the load control using a target load, it is preferable to then wait for an opportunity in which the reliability of the detection result based on the preview image information PRI detected by the camera 42 can be expected to recover, and resume the computation of the target load based on the preview image information PRI and the load control using the computed target load.

Thus, the electric suspension device 11 based on the sixth aspect is configured such that in the case where the target load computation unit 43 has computed the target load based on the sprung speed SV detected by the 3D gyro sensor 44 and the load control unit 45 is controlling the load of the electromagnetic actuator 13 by using the computed target load, then if information indicating that the front road surface is even is acquired as the detection result based on the sprung speed SV detected by the 3D gyro sensor 44 and thereafter information indicating that the front road surface is uneven is acquired as the detection result based on the preview image information PRI detected by the camera 42, the target load computation unit 43 computes the target load based on the preview image information PRI, and the load control unit 45 controls the load of the electromagnetic actuator 13 by using the computed target load.

According to the electric suspension device 11 based on the sixth aspect, an opportunity in which information indicating that the front road surface is even is acquired as the detection result based on the sprung speed SV detected by the 3D gyro sensor 44 is considered an opportunity in which the reliability of the detection result based on the preview image information PRI detected by the camera 42 can be expected to recover. After this opportunity comes, the electric suspension device 11 based on the sixth aspect waits to acquire information indicating that the front road surface is uneven as the detection result based on the preview image information PRI detected by the camera 42, and then resumes the computation of the target load based on the preview image information PRI and the load control using the computed target load. Thus, the electric suspension device 11 based on the sixth aspect can ensure the accuracy of the load control using a target load and maintain the ride quality of the vehicle 10 more comfortable than the electric suspension device 11 based on the fifth aspect.

OTHER EMBODIMENTS

The plurality of embodiments described above represent examples of embodying the present invention. Therefore, the technical scope of the present invention shall not be interpreted in a limited manner by these embodiments. This is because the present invention can be implemented in various ways without departing from its gist or its main characteristic features.

For example, in the description of the electric suspension device 11 according to the present invention, the electromagnetic actuator 13 to which the rotational driving force of the electric motor 31 converted in the stroke direction is applied has been described as an example of the member corresponding to the actuator according to the present invention. However, the present invention is not limited to this example.

A publicly known mono-tube (de Carbon) adjustable damper as disclosed in, for example, Japanese Patent Application Publication 2015-47906 may be employed as the member corresponding to the actuator according to the present invention. This adjustable damper includes a circular cylinder filled with a magnetorheological fluid (MRF) and a piston rod inserted therein so as to be axially slidable. A piston mounted to the distal end of the piston rod partitions the inside of the cylinder into an upper oil chamber and a lower oil chamber. This piston is provided with a communication channel through which the upper oil chamber and the lower oil chamber communicate with each other, and a MLV coil located inside this communication channel.

Also, in the description of the electric suspension devices 11 according to the embodiments of the present invention, the camera 42 has been described as an example of the road surface condition detection unit that detects the front road surface condition of the front road surface in front of the vehicle 10. However, the present invention is not limited to this example.

In the present invention, a radar or a lidar may be employed instead of or in addition to the camera 42 as the road surface condition detection unit that detects the front road surface condition of the front road surface in front of the vehicle 10.

Note that the radar acquires distribution information on targets including a leading vehicle being a following target traveling ahead of the vehicle 10 and the preview image information PRI on the road surface in front of the vehicle 10 by emitting radar waves to the targets and receiving the radar waves reflected by the targets, the distribution information including the distances to the targets and the orientations of the targets. Laser beams, microwaves, millimeter waves, ultrasonic waves, or the like can be used as the radar waves as appropriate.

Also, the lidar (Light Detection and Ranging) detects the presence of a target, the distance to a target, and the preview image information PRI on the road surface in front of the vehicle 10 by, for example, measuring the time taken to detect scattered light of emitted light.

Also, the electric suspension devices 11 according to the embodiments of the present invention have been described by taking an example in which a total of four electromagnetic actuators 13 are disposed for both the front wheels (front left wheel and front right wheel) and the rear wheels (rear left wheel and rear right wheel). However, the present invention is not limited to this example. A configuration in which a total of two electromagnetic actuators 13 are disposed for either the front wheels or the rear wheels may be employed.

Lastly, in the description of the electric suspension devices 11 according to the embodiments of the present invention, the load control unit 45 has been mentioned which controls the loads of the plurality of electromagnetic actuators 13 independently of each other.

Specifically, the load control unit 45 may control the loads of the electromagnetic actuators 13 provided for the four wheels independently on a wheel-by-wheel basis.

Alternatively, the load control unit 45 may control the loads of the electromagnetic actuators 13 provided for the four wheels such that the loads of the electromagnetic actuators 13 on the front wheels are controlled independently of those of the electromagnetic actuators 13 on the rear wheels or the loads of the electromagnetic actuators 13 on the left wheels are controlled independently of those of the electromagnetic actuators 13 on the right wheels.

What is claimed is:

1. An electric suspension device including an actuator that is provided between a body and a wheel of a vehicle and generates a load for damping vibration of the body, the electric suspension device comprising an ECU configured to:
   detect a prediction value of preview image information on a front road surface condition of a front road surface in front of the vehicle;
   detect a measured value of sprung mass state information on sprung state amounts of a sprung mass of the vehicle;
   compute a target load based on the front road surface condition and the sprung state amounts;
   acquire information on whether the vehicle is making a turn and information on whether an acceleration or deceleration operation is performed in the vehicle; and control the load of the actuator by using the computed target load, wherein in a case where information indicating that the front road surface is even is acquired as a detection result based on the front road surface condition but information indicating that the front road surface is uneven is acquired as a detection result based on the sprung state amounts, the target load is computed based on the sprung state amounts, in a case where the target load is computed based on the sprung state amounts, the load of the actuator is controlled so as to bring a current target load gradually closer to the computed target load before controlling the load of the actuator by using the target load, the sprung state amounts include a sprung speed, in the case where information indicating that the front road surface is even is acquired as the detection result based on the front road surface condition but information indicating that the front road surface is uneven is acquired as the detection result based on the sprung state amounts, the target load is computed based on the sprung speed among the sprung state amounts only if the sprung speed is a predetermined speed threshold value or less, and in the case where information indicating that the front road surface is even is acquired as the detection result based on the front road surface condition but information indicating that the front road surface is uneven is acquired as the detection result based on the sprung state amounts, the target load is computed based on the sprung speed only if the vehicle is advancing straight and an acceleration or deceleration operation is not performed in the vehicle.

2. The electric suspension device according to claim 1, wherein in the case where the target load is computed based on the sprung state amounts and, while the load of the actuator is controlled by using the computed target load, information indicating that the front road surface is uneven is acquired as the detection result based on the front road surface condition, the load of the actuator continues to be controlled by using the computed target load.

3. The electric suspension device according to claim 2, wherein in the case where the target load is computed based on the sprung state amounts and the load of the actuator is controlled by using the computed target load, then if information indicating that the front road surface is even is acquired as the detection result based on the sprung state amounts and thereafter information indicating that the front road surface is uneven is acquired as the detection result based on the front road surface condition the target load is computed based on the front road surface condition, and the actuator is controlled by using the computed target load.

* * * * *